United States Patent
Zhang et al.

(10) Patent No.: US 11,581,567 B2
(45) Date of Patent: Feb. 14, 2023

(54) LITHIUM ION BATTERY AND ELECTROLYTE THEREOF

(71) Applicant: Contemporary Amperex Technology Co., Limited, Fujian (CN)

(72) Inventors: Ming Zhang, Fujian (CN); Changlong Han, Fujian (CN); Hao Zhang, Fujian (CN); Cuiping Zhang, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 15/896,103

(22) Filed: Feb. 14, 2018

(65) Prior Publication Data
US 2018/0241078 A1    Aug. 23, 2018

(30) Foreign Application Priority Data
Feb. 23, 2017 (CN) .......................... 201710099288.6

(51) Int. Cl.
| | |
|---|---|
| H01M 10/0525 | (2010.01) |
| H01M 10/0567 | (2010.01) |
| H01M 10/0568 | (2010.01) |
| H01M 10/0569 | (2010.01) |
| C07F 7/18 | (2006.01) |
| C07F 9/659 | (2006.01) |

(52) U.S. Cl.
CPC .......... *H01M 10/0525* (2013.01); *C07F 7/18* (2013.01); *C07F 9/659* (2013.01); *H01M 10/0567* (2013.01); *H01M 10/0568* (2013.01); *H01M 10/0569* (2013.01); *H01M 2300/002* (2013.01); *H01M 2300/0025* (2013.01); *Y02T 10/70* (2013.01)

(58) Field of Classification Search
CPC ......... H01M 10/0525; H01M 10/0567; H01M 10/0568; H01M 10/0569; H01M 2300/002; H01M 2300/0025; C07F 7/18; C07F 9/659; Y02T 10/7011
See application file for complete search history.

(56) References Cited

U.S. PATENT DOCUMENTS

| | | | |
|---|---|---|---|
| 6,203,942 B1 * | 3/2001 | Gan | H01M 10/0567 429/203 |
| 6,379,846 B1 * | 4/2002 | Terahara | H01M 6/168 252/62.2 |
| 2013/0330609 A1 * | 12/2013 | Sawa | H01M 10/4235 429/188 |
| 2016/0126593 A1 * | 5/2016 | Abe | H01M 6/162 429/332 |
| 2017/0125846 A1 * | 5/2017 | Yu | H01M 10/0525 |

FOREIGN PATENT DOCUMENTS

WO    WO-2014203912 A1 * 12/2014 ............ H01M 6/162

* cited by examiner

*Primary Examiner* — Cynthia H Kelly
*Assistant Examiner* — Kirsten B Tysl
(74) *Attorney, Agent, or Firm* — Anova Law Group, PLLC

(57) ABSTRACT

The present invention provides a lithium ion battery and an electrolyte thereof. The electrolyte for the lithium ion battery includes a non-aqueous organic solvent, a lithium salt and additives, wherein the additives include additive A cyclophosphazene compound, additive B lithium fluorophosphate compound, and additive C selected from at least one of silane phosphate compound, silane phosphite compound and silane borate compound. Compared with conventional technologies, the nickel-rich positive electrode lithium ion battery using the electrolyte of the present invention has a desirable cyclic capacity retention rate, a desirable storage capacity retention rate and a low gas production at high temperature, and has a low DC internal resistance at low temperature, which can remarkably improve the thermal stability of lithium ion battery.

9 Claims, No Drawings

LITHIUM ION BATTERY AND ELECTROLYTE THEREOF

CROSS-REFERENCE TO RELATED APPLICATION

The present patent application claims priority to Chinese patent application number 201710099288.6 filed on Feb. 23, 2017, the whole disclosure of which is incorporated herein by reference.

BACKGROUND OF THE INVENTION

Field of the Invention

The present invention generally relates to lithium ion batteries, and more particularly, relates to a lithium ion battery and an electrolyte thereof.

Description of the Related Art

Lithium ion batteries have been widely used in consumer electronics, electric vehicles and energy storage power supplies due to high energy density, long cycle life, no pollution and other characteristics.

With the development of lithium ion batteries, people have put forward higher requirements on the cycle life of lithium ion batteries. In order to improve the energy density of lithium ion batteries, development of high capacity positive electrode material is one of the effective ways. At present, nickel-rich positive electrode materials have become the focus of research because of their higher theoretical specific capacity than other positive electrode materials. However, the use of nickel-rich positive electrode materials in batteries still has many problems:

1) The nickel content in nickel-rich positive electrode material is high, which makes it has a strong oxidation property, leads to the electrochemical oxidation of the electrolyte on the surface of the positive electrode, changes the structure of nickel-rich positive electrode materials, and leads to the reduction reaction and dissolution of the transition metal ions such as nickel and cobalt;

2) The alkaline content of the nickel-rich positive electrode material is high in the presence of water, chemical side-reactions between the nickel-rich positive electrode material and some additives in the electrolyte may occur;

3) The nickel-rich positive electrode materials have poor thermal stability.

The above problems will deteriorate the electrochemical and safety properties of lithium ion batteries containing nickel-rich positive electrode materials.

In view of the foregoing, what is needed thereof, is to provide a lithium ion battery having desirable performances and an electrolyte thereof, to improve high temperature cycle performance and safety performance of lithium ion batteries having the nickel-rich positive electrode materials.

SUMMARY OF THE INVENTION

One object of the present invention is to provide a lithium ion battery having desirable performance and an electrolyte thereof.

According to one embodiment of the present invention, a lithium ion battery electrolyte includes a non-aqueous organic solvent, a lithium salt and additives, wherein the additives include additive A cyclophosphazene compound, additive B lithium fluorophosphate compound, and additive C selected from at least one of silane phosphate compound, silane phosphite compound, and silane borate compound.

The inventors of the present invention have found that, via using the combination and synergy of cyclophosphazene compound and lithium fluorophosphate compound and at least one of silane phosphate compound, silane phosphite compound and silane borate compound, the comprehensive performance of lithium ion batteries having nickel-rich positive electrode materials can be improved.

The oxygen atoms in the lithium fluorophosphate structure can be complexed with the transition metal elements of nickel-rich positive electrode active material, so as to improve the stability of the positive electrode active material, inhibit the oxidative decomposition of the electrolyte, and reduce the gas production at high temperature.

However, research shows that the cyclic performance of the nickel-rich positive electrode material could be deteriorated at high temperature by lithium fluorophosphate, because the alkaline content of the nickel-rich positive electrode material is high, the powder pH value of nickel-rich positive electrode material can reach 12, and the surface of the material contains a lot of LiOH, $Li_2CO_3$ and other alkaline substances. At high temperature, the lithium fluorophosphate will react with the alkaline material on the surface of the nickel-rich positive electrode material in the presence of trace water, which will deteriorate the high temperature cycle performance of the battery.

The cycle performance of the battery at high temperature can be effectively improved when the cyclophosphazene compound is added to the electrolyte containing lithium fluorophosphates. The possible reason is that the cyclophosphazene compound can effectively absorb the trace water in the electrolyte and the trace water produced by the battery at high temperature, inhibit the side reaction between the alkaline substance on the surface of the nickel-rich positive electrode material and the lithium fluorophosphate, and retain the complexation effect of the lithium fluorophosphate with the transition metal elements.

However, the lithium fluorophosphate is easily decomposed at negative electrode, and the decomposition product covers the surface of the negative electrode. The resistance of the lithium intercalation in negative electrode is increased, and the low temperature DC resistance of the battery at low temperature is easy to increase. When at least one of a silane phosphate compound, a silane phosphite compound and a silane borate compound is added into an electrolyte containing lithium fluorophosphate, the —O—Si-chemical bond in silane phosphate compound, silane phosphite compound and silane borate compound is easily broken and combines with HF in the electrolyte, and changes the content ratio of the inorganic component to the organic component of the SEI film, which is beneficial to form a diffusion channel for lithium ion transmission. The SEI film with low impedance is generated by synergistic action on the negative electrode surface, which can reduce the DC resistance of the battery at low temperature significantly. At the same time, silane phosphate compound, silane phosphite compound and silane borate compound have water absorption function, and can improve the deterioration effect of high temperature cycle performance of lithium fluorophosphate.

According to one aspect of the present invention, the additive A is selected from at least one of the compounds represented by formula I;

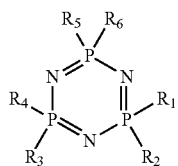

wherein $R_1$, $R_2$, $R_3$, $R_4$, $R_5$, $R_6$ are each independently selected from H, F, Cl, Br, I, alkyl group having 1 to 20 carbon atoms, a halogenated alkyl group having 1 to 20 carbon atoms, an alkenyl group having 2 to 20 carbon atoms, a halogenated alkenyl group having 2 to 20 carbon atoms, an aryl group having 6 to 26 carbon atoms, a halogenated aryl group having 6 to 26 carbon atoms, an alkoxy group having 1 to 20 carbon atoms, a halogenated alkoxy group having 1 to 20 carbon atoms, an aryloxy group having 6 to 26 carbon atoms, a halogenated aryloxy group having 6 to 26 carbon atoms, at least one of $R_1$, $R_3$ and $R_5$ represents an alkyl group having 1 to 20 carbon atoms, a halogenated alkyl group having 1 to 20 carbon atoms, an alkenyl group having 2 to 20 carbon atoms, a halogenated alkenyl group having 2 to 20 carbon atoms, an aryl group having 6 to 26 carbon atoms, a halogenated aryl group having 6 to 26 carbon atoms, an alkoxy group having 1 to 20 carbon atoms, a halogenated alkoxy group having 1 to 20 carbon atoms, an aryloxy group having 6 to 26 carbon atoms, a halogenated aryloxy group having 6 to 26 carbon atoms, at least two of $R_2$, $R_4$, $R_6$ are selected from F, Cl, Br, I.

According to one aspect of the present invention, at least one of $R_1$, $R_3$ and $R_5$ is selected from a group consisting of an alkyl group having 1 to 6 carbon atoms, a halogenated alkyl group having 1 to 6 carbon atoms, an alkenyl group having 2 to 6 carbon atoms, a halogenated alkenyl group having 2 to 6 carbon atoms, a phenyl group, a halogenated phenyl group, an alkoxy group having 1 to 6 carbon atoms, a halogenated alkoxy group having 1 to 6 carbon atoms, a phenoxy group, and a halogenated phenoxy group.

According to one aspect of the present invention, $R_2$, $R_4$, $R_6$ each is fluorine atom.

In the general formula I, among the alkyl group having 1 to 20 carbon atoms, the specific species of the alkyl groups are not particularly limited, and can be selected according to actual requirements. For example, both the chain alkyl group and the naphthenic group may be used, wherein the chain alkyl group includes a linear alkyl group and a branched alkyl group, and the ring of the naphthenic group may contain a substituent such as alkyl group or may not contain a substituent.

According to one aspect of the present invention, examples of the alkyl group includes methyl, ethyl, n-propyl, isopropyl, cyclopropyl, n-butyl, isobutyl, sec-butyl, tert-butyl, n-pentyl, isopentyl, neopentyl, cyclopentyl, n-hexyl, isohexyl, cyclohexyl, heptyl, cycloheptyl, octyl, cyclooctyl, nonyl, decyl, undecyl, dodecyl, tridecyl, tetradecyl, pentadecyl, hexadecyl, heptadecyl, octadecyl, nonadecyl, eicosyl and so on.

In the general formula I, among the halogenated alkyl group having 1 to 20 carbon atoms, the halogen atom is F, Cl, Br and I. The number of the halogen atoms and the substituted position are not particularly limited, and the halogen atom may be substituted for some hydrogen atoms or all hydrogen atoms in the alkyl group according to actual demand. For example, the number of halogen atoms may be one, two, three, four or more. When the number of halogen atoms substituting for hydrogen atoms is more than two, the species of the halogen atoms may be the same or different or the species of the halogen atoms may be partially the same.

According to one aspect of the present invention, examples of the halogenated alkyl group includes chloromethyl, 1-chloroethyl, 2-chloroethyl, 2-chloroisobutyl, 1,2-dichloroethyl, 1,3-dichloroisopropyl, 1,3-dichloro-tert-butyl, 1,2,3-trichloropropyl, bromomethyl, 1-bromoethyl, 2-bromoethyl, 2-bromoisobutyl, 1,2-dibromoethyl, 1,3-dibromoisopropyl, 1,3-dibromo-tert-butyl, 1,2,3-tribromopropyl, iodomethyl, 1-iodoethyl, 2-iodoethyl, 2-iodoisobutyl, 1,2-diiodoethyl, 1,3-diiodoisopropyl, 1,3-diiodo-tert-butyl, 1,2,3-triiodopropyl, fluoromethyl, 2-fluoroisobutyl, 2-fluoroethyl, 1-fluoroethyl, 3-fluoro-n-propyl, 2-fluoroisopropyl, 4-fluoro-n-butyl, 3-fluoro-sec-butyl, 2-fluoro-sec-butyl, 5-fluoro-n-pentyl, 1-fluoro-n-pentyl, 4-fluoroisopentyl, 3-fluoroisopentyl, 6-fluoro-n-hexyl, 4-fluoro-isohexyl, 7-fluoro-n-heptyl, 8-fluoro-n-octyl, 1,2-difluoroethyl, difluoromethyl, trifluoromethyl, pentafluoroethyl, perfluoroisopropyl, perfluorobutyl, perfluorocyclohexyl and so on.

In the general formula I, among the alkenyl group having 2 to 20 carbon atoms, the species and the number of alkenyl groups are not particularly limited and can be selected according to actual requirements, such as chain alkenyl and cycloalkenyl groups, wherein the chain alkenyl group includes linear alkenyl group and branched alkenyl group, the ring of the cycloalkenyl group may contain a substituent of an alkyl group or may not contain a substituent. In particular, the number of double bond may be one, two, three or four.

According to one aspect of the present invention, examples of the alkenyl group includes vinyl, allyl, 1-butenyl, 2-butenyl, 3-butenyl, 1,3-butadienyl, 1-pentenyl, 2-pentenyl, 3-pentenyl, 1-hexenyl, 2-hexenyl, 3-hexenyl, 1-heptenyl, 2-heptenyl, 3-heptenyl, 4-heptenyl, 5-heptenyl, 6-heptenyl, 1-octenyl, 2-octenyl, 3-octenyl, 4-octenyl, 5-octenyl 6-octenyl, 7-octenyl, 1-methylvinyl, styryl, 2,2-diphenylvinyl, 1,2-diphenylvinyl, 1-methylallyl, 1,1-dimethylallyl, 2-methylallyl, 1-phenylallyl, 2-phenylallyl, 3-phenylallyl, 3,3-diphenylallyl, 1,2-dimethylallyl, 1-phenyl-1-butenyl, 3-phenyl-1-butenyl, cyclopentenyl, cyclohexenyl, cycloheptenyl and so on.

In the general formula I, among the halogenated alkenyl group having 2 to 20 carbon atoms, the halogen atom is F, Cl, Br and I. The number of the halogen atoms and the substituted position are not particularly limited, and the halogen atoms may be substituted for some hydrogen atoms or all hydrogen atoms in the alkenyl group according to actual demand. For example, the number of halogen atoms may be one, two, three or four. When the number of halogen atoms substituting for hydrogen atoms is more than two, the species of the halogen atoms may be the same or different or the species of the halogen atoms may be partially the same.

According to one aspect of the present invention, examples of the halogenated alkenyl group including: 1-fluorovinyl, 1-fluoroallyl, 2-fluoroallyl, 3-fluoroallyl, 2-fluoroisopropenyl, 1-fluoro-1-butenyl, 2-fluoro-1-butenyl, 3-fluoro-1-butenyl, 4-fluoro-1-butenyl, 4-fluoro-2-butenyl, 3-fluoro-2-methylpropenyl, 1-fluoro-2-methylpropenyl, 2-fluoro-1-methylpropyl, 3-fluoro-1-methylpropenyl, 3-fluoro-2-methylpropenyl, 4-fluoro-3, 3-dimethyl-1-butenyl, 6-fluoro-5-hexenyl, 6-fluoro-4-hexenyl, 6-fluoro-2-hexenyl, 6-fluoro-3-hexenyl, 6-fluoro-1-hexenyl, 3-fluoro-2-butenyl, 2-fluoro-2-butenyl, 1-fluoro-2-butenyl, 5-fluoro-2-pentenyl, 5-fluoro-3-pentenyl, 7-fluoro-1-heptenyl, 7-fluoro-2-heptenyl, 7-fluoro-3-heptenyl, 7-fluoro-4-heptenyl, 7-fluoro-5-heptenyl, 7-fluoro-6-heptenyl, 8-fluoro-1- octenyl, 8-fluoro-2-octenyl, 8-fluoro-3-octenyl, 8-fluoro-4-octenyl, 8-fluoro-5-octenyl, 8-fluoro-6-octenyl, 8-fluoro-7-octenyl and so on, wherein F can be substituted with Cl, Br and/or I.

In the general formula I, among the aryl group having 6 to 26 carbon atoms, the species and the number of aryl groups are not particularly limited and may be selected according to actual requirements, such as phenyl, phenylalkyl, an aryl group containing at least one phenyl group, such as biphenyl, condensed aromatic hydrocarbon groups. Other substituting groups may be attached to the biphenyl group and the condensed aromatic hydrocarbon groups, such as alkyl group.

According to one aspect of the present invention, examples of the aryl group including: phenyl, benzyl, 1-naphthyl, 2-naphthyl, 1-anthryl, 1-phenanthryl, o-methylphenyl, m-methylphenyl, p-methylphenyl, p-ethylphenyl, m-ethylphenyl, o-ethylphenyl, 2-methyl-1-naphthyl, 3-methyl-1-naphthyl, 4-methyl-1-naphthyl, 5-methyl-1-naphthyl, 6-methyl-1-naphthyl, 7-methyl-1-naphthyl, 8-methyl-1-naphthyl, 1-methyl-2-naphthyl, 3-methyl-2-naphthyl, 4-methyl-2-naphthyl, 5-methyl-2-naphthyl, 6-methyl-2-naphthyl, 7-methyl-2-naphthyl, 8-methyl-2-naphthyl, 3-fluorenyl, 9-fluorenyl, 1-tetrahydronaphthyl, 2-tetrahydronaphthyl, 1-acenaphthyl, 1-indanyl, 2-indanyl, 4-vinylphenyl, 3-isopropylphenyl, 4-isopropylphenyl, 4-butylphenyl, 4-isobutylphenyl, 4-n-pentylphenyl, 4-isopentylphenyl, 4-tert-pentylphenyl, 4-tert-butylphenyl, 4-hexylphenyl, 4-cyclohexylphenyl, 4-octylphenyl, 4-(2-ethylhexyl)phenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-di-tert-butylphenyl, 2,5-di-tert-butylphenyl, 2,6-di-tert-butylphenyl, 2,4-di-tert-pentylphenyl, 2,5-di-tert-pentylphenyl, cyclohexylphenyl, biphenyl, 2,4,5-trimethylphenyl, 2,4,6-trimethylphenyl and so on.

In the general formula I, among the halogenated aryl group having 6 to 26 carbon atoms, the halogen atom is F, Cl, Br and I. The number of the halogen atoms and the substituted position are not particularly limited. The number of halogen atoms may be one, two, three, four, five or more. When the number of halogen atoms substituting for hydrogen atoms is more than two, the species of the halogen atoms may be the same or different or the species of the halogen atoms may be partially the same.

According to one aspect of the present invention, examples of the halogenated aryl group includes 2-fluorophenyl, 3-fluorophenyl, 4-fluorophenyl, 2-fluoro-4-methylphenyl, 3-fluoro-4-methylphenyl, 4-fluoro-2-methylphenyl, 2,4-difluorophenyl, 3,4-difluorophenyl, 2,6-difluoro-4-methylphenyl, 2,6-difluoro-3-methylphenyl, 2-fluoro-1-naphthyl, 4-fluoro-1-naphthyl, 2,4,6-trifluorophenyl, 2,3,4,6-tetrafluorophenyl, 4-trifluoromethylphenyl, 2,3,4,5-tetrafluorophenyl, pentafluorophenyl, 3,5-bis(trifluoromethyl)phenyl, trifluoroanthryl, perfluoro-anthryl, perfluorobiphenyl and so on. In the examples enumerated above, F therein can be substituted with Cl, Br and/or I.

In the general formula I, among the aryloxy group having 6 to 26 carbon atoms, the position of oxygen atoms and the number of oxygen atoms are not particularly limited and can be selected according to actual requirements. The number of oxygen atoms may be one, two, three or four.

According to one aspect of the present invention, examples of the aryloxy group includes phenoxy, benzyloxy, 2-methylphenoxy, 3-methylphenoxy, 4-methylphenoxy, 2,3-dimethylphenoxy, 2,4-dimethylphenoxy, 2,5-dimethylphenoxy, 2,6-dimethylphenoxy, 3,4-dimethylphenoxy, 3,5-dimethylphenoxy, 2,3,4-trimethylphenoxy, 2,3,5-trimethylphenoxy, 2,3,6-trimethylphenoxy, 2,4,5-trimethylphenoxy, 2,4,6-trimethylphenoxy, 3,4,5-trimethylphenoxy, 2,3,4,5-tetramethylphenoxy, 2,3,4,6-tetramethylphenoxy, 2,3,5,6-tetramethylphenoxy, pentamethylphenoxy, 4-ethylphenoxy, 4-n-propylphenoxy, 4-isopropylphenoxy, 4-n-butylphenoxy, 4-sec-butylphenoxy, 4-tert-butylphenoxy, 4-n-hexylphenoxy, 4-n-octylphenoxy, 4-n-decylphenoxy, 4-n-tetradecylphenoxy, 1-naphthyloxy, 2-naphthyloxy, 1-anthryloxy, 1-phenyloxy, 9-fluorenyloxy, 1-tetrahydronaphthyloxy, 2-tetrahydronaphthyloxy, 1-acenaphthyloxy, 1-indanyloxy, 2-indanyloxy and so on.

In the general formula I, among the halogenated aryloxy group having 6 to 26 carbon atoms, the halogen atom is F, Cl, Br, I. The number of halogen atoms may be one, two, three, four or more. When the number of halogen atoms substituting for hydrogen atoms is more than two, the species of halogen atoms may be the same or different, or the species of the halogen atoms may be partially the same.

According to one aspect of the present invention, examples of the halogenated aryloxy group includes 4-fluorophenoxy, 3-fluorophenoxy, 2-fluorophenoxy, 2,3-difluorophenoxy, 2,4-difluorophenoxy, 2,5-difluorophenoxy, 2,6-difluorophenoxy, 3,4-difluorophenoxy, 3,5-difluorophenoxy, 2,3,4-trifluorophenoxy, 2,3,5-trifluorophenoxy, 2,3,6-trifluorophenoxy, 2,4,5-trifluorophenoxy, 2,4,6-trifluorophenoxy, 2,3,4,5-tetrafluorophenoxy, 2,3,4,6-tetrafluorophenoxy, pentafluorophenoxy, 4-fluoromethylphenoxy, 3-fluoromethylphenoxy, 3-(trifluoromethyl)phenoxy, 4-(trifluoromethyl)phenoxy, 2-fluoromethylphenoxy, 4-(1-fluoroethyl)phenoxy, 3-(2-fluoroethyl)phenoxy, 2-(1-fluoroethyl)phenoxy, 3,5-difluoromethylphenoxy, 3,5-difluoroethylphenoxy, 4-fluorobenzyloxy, 3-fluorobenzyloxy, 2-fluorobenzyloxy, 2-fluoro-1-naphthyloxy and so on. In the examples enumerated above, the F therein may be substituted with Cl, Br and/or I.

In the general formula I, when the alkyl group having 1 to 20 carbon atoms is added oxygen atoms to form a group, the position and the number of oxygen atoms to be added are not particularly limited, and can be selected according to actual requirements. Such as an alkoxy group or an ether group may be formed, and the number of oxygen atoms may be one, two, three or four.

According to one aspect of the present invention, examples of the alkoxy group include methoxy, ethoxy, n-propoxy, isopropoxy, n-butoxy, sec-butoxy, tert-butoxy, n-pentyloxy, isopentyloxy, cyclopentyloxy, n-hexyloxy, cyclohexyloxy, isohexyloxy, heptoxy, octyloxy, 2-ethylhexyloxy, 3-methyl-2-pentyloxy, 5-methyl-3-hexyloxy, 2-ethyl-1-cyclohexyloxy, nonyloxy, decyloxy, 3,7-dimethyloctyloxy,

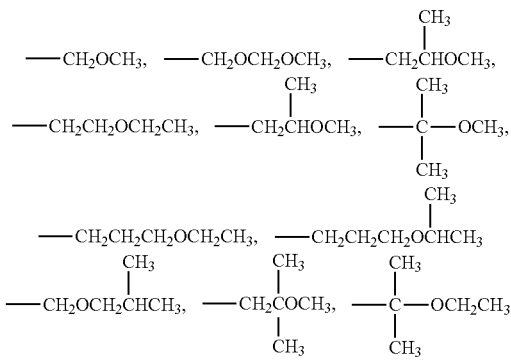

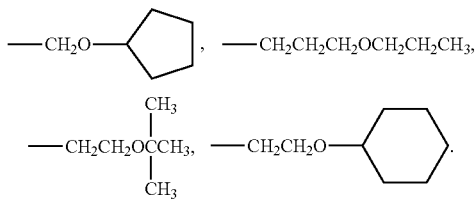

In the general formula I, among the halogenated alkoxy group having 1 to 20 carbon atoms, the halogen atom is F, Cl, Br, I. The species of the alkoxy group to which the halogenated group is attached is not specifically limited, and may be selected according to actual requirements, such as a chain alkoxy group and a cyclic alkoxy group, and the chain alkoxy group further includes a linear alkoxy group and a branched alkoxy group, and the number of oxygen atoms in the alkoxy group is preferably one or two. The cyclic alkoxy group may contain a substituent or may not contain a substituent. In addition, the number of halogenated groups attached to the alkoxy group may be one, two, three or four.

According to one aspect of the present invention, examples of the halogenated alkoxy group include fluoromethoxy, 2-fluoroethoxy, 3-fluoro-n-propoxy, 2-fluoroisopropoxy, 4-fluoro-n-butoxy, 3-fluoro-sec-butoxy, 5-fluoro-n-pentyloxy, 4-fluoroisopentyloxy, 3-fluoro-tert-pentyloxy, 3-fluoro-2,2-dimethylpropoxy, 3-fluoro-1-ethylpropoxy, 4-fluoro-1-methylbutoxy, 6-fluoro-n-hexyloxy, 5-fluoroisohexyloxy, 3-fluoro-1,1,2-trimethylpropoxy, 7-fluoro-n-heptyloxy, 8-fluoro-n-octyloxy, 2-fluorocyclopropoxy, 2,3-difluorocyclopropoxy, 2-fluorocyclobutoxy, 2-fluorocyclopentyloxy, 2-fluorocyclohexyloxy, 4-fluorocyclohexyloxy, 2-fluorocyclohexyloxy, 2-fluorocyclooctyloxy and so on. In the examples enumerated above, the F therein may be substituted with Cl, Br and/or I.

In particular, the compound A may be selected from at least one of the compounds 1 to 9 as following.

1

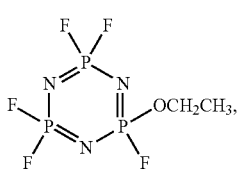

2

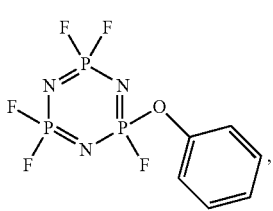

3

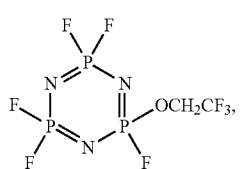

4

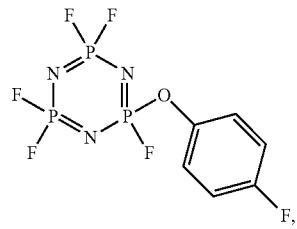

5

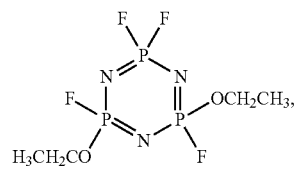

6

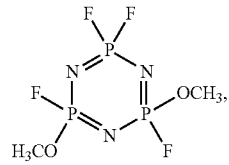

7

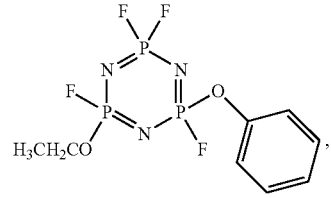

8

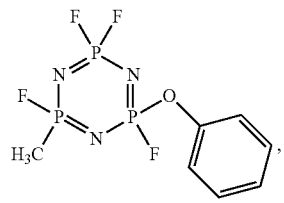

9

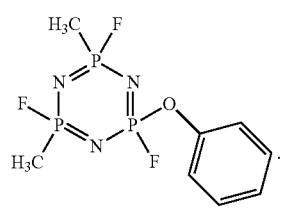

According to one aspect of the present invention, the weight content of the additive A in the electrolyte is 0.1 wt % to 10 wt %. When the content of the additive A in the electrolyte is less than 0.1 wt %, the additive A cannot effectively absorb the water in the battery, the high temperature cycle performance of the lithium ion battery cannot be improved significantly. When the content of the additive A in the electrolyte is more than 10 wt %, the concentration of the electrolyte will be significantly increased, the conductivity of the electrolyte will be reduced, which will reduce the migration rate of lithium ion and deteriorate the performance of lithium ion battery.

According to one aspect of the present invention, the weight content of the additive B in the electrolyte is 0.1 wt % to 3 wt %, and the additive B is selected from at least one of the compounds 10 and 11.

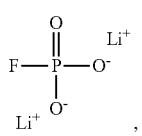

10

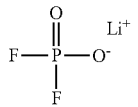

11

When the weight content of the additive B in the electrolyte is less than 0.1 wt %, the complete passivation film cannot be formed on the surface of the positive electrode material, and the oxidation side reaction of the electrolyte on its surface can not be effectively prevented. When the weight content of the additive B in the electrolyte is more than 3 wt %, a thick passivation film will be formed on the surface of the positive electrode and negative electrode. The passivation film has a high impedance, which will affect the transmission of lithium ion in the passivation film, and increase the polarization of the battery, and will deteriorate the performance of lithium ion battery.

According to one aspect of the present invention, the additive C is selected from at least one of the compounds represented by the formulas II, III, and IV;

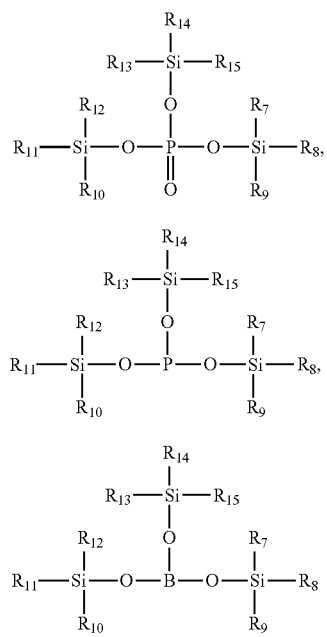

wherein $R_7$, $R_8$, $R_9$, $R_{10}$, $R_{11}$, $R_{12}$, $R_{13}$, $R_{14}$, $R_{15}$ are each independently selected from an alkyl group or a halogenated alkyl having 1 to 6 carbon atoms.

According to one aspect of the present invention, examples of the phosphate ester compounds, the phosphite compounds and the borate compounds includes tris(trimethylsilyl)phosphate, tris(triethylsilyl) phosphate, tris(tri-n-propylsilyl)phosphate, tris(tri-n-butylsilyl)phosphate, tris (trimethylsilyl)phosphite, tris(triethylsilyl)phosphite, tris(tri-n-propylsilyl)phosphite, tris(tri-n-butylsilane)phosphite, tris (trimethylsilyl)borate, tri(triethylsilyl)borate, tris (tri-n-propylsilane)borate, tris(tri-n-butylsilane)borate; Preferably, the additive C is selected from at least one of the tris (trimethylsilyl)phosphate (compound 12), tris (trimethylsilyl)phosphite (compound 13), tris(trimethylsilyl)borate (compound 14).

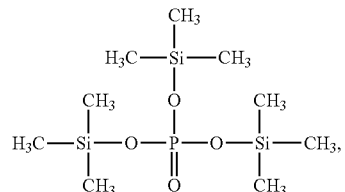

12

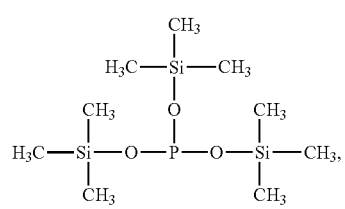

13

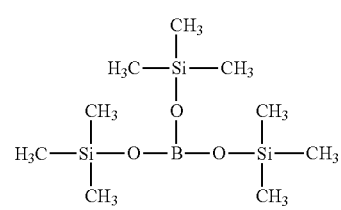

14

According to one aspect of the present invention, the weight content of the additive C in the electrolyte is 0.1 wt % to 2 wt %. When the weight content of the additive C in the electrolyte is less than 0.1 wt %, the decrease of low temperature DC resistance of the battery is not obvious. When the weight content of the additive C in electrolyte is more than 2 wt %, the high temperature cycle performance of the battery will be deteriorated.

According to one aspect of the present invention, the organic solvent is selected from at least two of the group consisting of ethylene carbonate, propylene carbonate, butylene carbonate, fluoroethylene carbonate, methyl ethyl carbonate, dimethyl carbonate, diethyl carbonate, dipropyl carbonate, methyl propyl carbonate, ethyl propyl carbonate, 1,4-butyrolactone, γ-butyrolactone, methyl propionate, methyl butyrate, ethyl acetate, ethyl propionate, and ethyl butyrate.

According to one aspect of the present invention, the lithium salt is selected from at least one of $LiPF_6$, $LiClO_4$, $LiAsF_6$, lithium di(trifluoromethanesulfonyl)imide (LiTFSI), lithium di(fluorosulfonyl)imide (LiFSI), lithium difluoro(oxalato)borate (LiDFOB), lithium difluorodioxaltophosphate (LiDFOP), lithium bis(oxalato)borate (LiBOB), the concentration of the lithium salt is 0.5M to 1.5M. Preferably, the molar concentration of the lithium salt is 0.8M to 1.2M. More preferably, the lithium salt is $LiPF_6$.

According to one aspect of the present invention, the additive further includes at least one of vinylene carbonate (VC), vinyl ethylene carbonate (VEC), fluoroethylene carbonate (FEC), succinonitrile (SN), adiponitrile (ADN), ethylene sulfate (DTD), 1,3-propanesultone (1,3-PS), 1,3-propene sultone (PST).

The other object of the present invention is to provide a lithium ion battery with desirable stability and safety performance.

According to one embodiment of the present invention, a lithium ion battery includes a positive electrode plate, a negative electrode plate, a separator interposed between the positive electrode plate and the negative electrode plate and an electrolyte. The positive electrode plate includes a positive electrode current collector and a positive electrode active material formed thereon. The negative electrode plate includes a negative electrode current collector and a negative electrode active material formed thereon. The electrolyte is the lithium ion battery electrolyte according to the present invention and the positive electrode active material is $LiNi_{1-x-y}Co_xM_yO_2$, wherein M is Mn or Al, $0 \leq x \leq 0.5$, $0 \leq y \leq 0.5$, $0 \leq x+y \leq 0.5$.

In the lithium ion battery of the present invention, the type of the separator is not particularly limited and may be any of the separator materials used in the prior art, for instance polyethylene, polypropylene, polyvinylidene fluoride and their multilayer composite film, but not limited to these.

Compared with conventional technologies, the lithium ion battery and the electrolyte thereof according to the present invention at least have the following technical advantages.

(1) The lithium ion battery electrolyte of the present invention has a cyclic phosphazene compound, a lithium fluorophosphate compound and at least one compound selected from a group consisting of a silane phosphate compound, a silane phosphite compound and a silane borate compound as additive, which can significantly improve the high temperature storage performance and stability of the battery and can inhibit the gas generation phenomenon of the lithium ion battery at high temperature;

(2) The lithium ion battery of the invention has excellent high temperature cycle storage performance; and (3) The lithium ion battery of the present invention has low low-temperature resistance.

DETAILED DESCRIPTION OF THE PREFERRED EMBODIMENT

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Without specific instructions, the reagents, materials and apparatus used in the Examples and Comparative Examples are commercially available and the reagents used in the present invention may also be prepared by conventional methods.

Example 1

(1) Preparation of Positive Electrode Plate

Uniformly stirring and mixing positive electrode active material of $LiNi_{0.8}Co_{0.1}Mn_{0.1}O_2$, conductive agent of conductive carbon black Super P and binder of PVDF in solvent of NMP at a weight ratio of 97:1.4:1.6 to obtain positive electrode slurry, wherein the solid content of the positive electrode slurry is 77 wt %. Coating the positive electrode slurry on an Al foil evenly, drying the Al foil coated with positive electrode slurry at 85° C., and obtaining the positive electrode plate after cold-pressing, cutting and dividing, and drying under vacuum at 85° C. for 4 h.

(2) Preparation of Negative Electrode Plate

Uniformly stirring and mixing negative electrode active material of graphite, conductive agent of conductive carbon black Super P, thicker of carboxymethylcellulose sodium (CMC) and binder of styrene-butadiene rubber emulsion (SBR) in a solvent system of de-ionized water at a weight ratio of 96.4:1.5:0.5:1.6 to obtain negative electrode slurry, wherein the solid content of the negative electrode slurry is 54 wt %. Coating the negative electrode slurry on a Cu foil evenly, drying the Cu foil coated with the negative electrode slurry at 85° C. and obtaining the negative electrode plate after cold-pressing, cutting and dividing, and drying under vacuum at 120° C.

(3) Preparation of Electrolyte

Mixing ethylene carbonate (EC) and methyl ethyl carbonate (EMC) at a weight ratio of 30:70 in an argon atmosphere glove box having a water content of less than 10 ppm to obtain the organic solvent, dissolving the lithium salt $LiPF_6$ into the organic solvent, and adding additive A (compound 1), additive B (compound 11) and additive C (compound 12) to obtain the electrolyte, wherein the concentration of $LiPF_6$ is 1 mol/L.

(4) Preparation of Separator

A polyethylene film (PE) having a thickness of 16 μm is used as the separator.

(5) Preparation of Lithium Ion Battery

The positive electrode plate, the separator and the negative electrode plate are folded in sequence to obtain a battery cell in which the separator is located between the positive electrode plate and the negative electrode plate, and the battery cell is wound to obtain a square naked battery having a thickness of 4.0 mm, a width of 60 mm, a length of 140 mm. The pole tab is welded. The battery cell is put in an aluminum foil package. After baking and removing water at 80° C., the prepared electrolyte is injected and the foil package is packed. After standing, cold pressing, charging at constant current of 0.02 C to 3.3 V and at constant current of 0.1 C to 3.6 V, shaping and capacity test, a lithium ion battery is obtained.

The tests of Examples 2 to 23 and Comparative examples 1 to 8 are substantially the same as Example 1. The battery systems, the related substances and the content of the Examples and Comparative examples, and the test results are shown in Tables 1 to 2.

Testing Process of the Lithium Ion Battery (1) Cycle Performance Test of the Lithium Ion Battery The battery is charged at a constant current of 1 C to 4.2 V at 45° C., and charged at a constant voltage of 4.2 V to reach 0.05 C, and further discharged to 2.8 V at a constant current of 1 C. Take it as a charge-discharge cycle process and the resulting discharge capacity is the discharge capacity of the lithium ion battery after the first cycle. The lithium ion batteries are subjected to 500 cycles of charge/discharge test according to the method above.

The capacity retention rate (%) of the lithium ion battery after 500 cycles=the discharge capacity after 500 cycles/the discharge capacity after the first cycle*100%.

(2) High Temperature Storage Test of the Lithium Ion Battery

The lithium ion battery is allowed to stand at 25° C. for 30 minutes, charged to 4.2 V at a constant current of 1 C, and further charged to 0.05 C at a constant voltage of 4.2 V. The volume of the lithium ion battery is tested and marked the volume as V0. The fully-charged battery is put into a baking oven at 80° C. for 10 days, after the storage procedure, the volume is tested by drainage method and marked the volume as V1.

The volume expansion rate of the lithium ion battery after being stored at 80° C. for 10 days is the volume expansion rate (%)=(V1−V0)/V0*100%.

(3) Low Temperature Direct Current Resistance (DCR) Test of the Lithium Ion Battery The state of charge (SOC) is adjusted to 20% of the battery capacity at room temperature, and then the lithium ion battery is put into a −25° C. low temperature box for 2 hours, until the battery temperature reaches −25° C. The lithium ion battery is discharged at 0.3 C for 10 s. The voltage before being discharged is marked as U1, the voltage after being discharged is marked as U2, the discharge DCR=(U1−U2)/I.

(4) High Temperature Thermal Stability Test of the Lithium Ion Battery

The lithium ion battery which had been subjected to 500 cycles is charged to 4.2V at a constant current of 0.5 C under 25° C., further charged to 0.05 C at a constant voltage of 4.2 V, and then is put into a baking oven at 150° C. for 1 h, to observe the state of lithium ion battery.

TABLE 1

The battery system, related substances and content of Examples 1 to 23 and comparative Examples 1 to 8

| | | Lithium salt | | Additive A | | Additive B | | Additive C | | Other additive and content |
|---|---|---|---|---|---|---|---|---|---|---|
| | Battery system | Species | Concentration | Species | Content | Species | Content | Species | Content | |
| Example 1 | $LiNi_{0.8}Co_{0.1}Mn_{0.1}O_2$/graphite | $LiPF_6$ | 1M | Compound 1 | 5% | Compound 11 | 0.1% | Compound 12 | 1.0% | / |
| Example 2 | $LiNi_{0.8}Co_{0.1}Mn_{0.1}O_2$/graphite | $LiPF_6$ | 1M | Compound 1 | 5% | Compound 11 | 0.5% | Compound 12 | 1.0% | / |
| Example 3 | $LiNi_{0.8}Co_{0.1}Mn_{0.1}O_2$/graphite | $LiPF_6$ | 1M | Compound 1 | 5% | Compound 11 | 1% | Compound 12 | 1.0% | / |
| Example 4 | $LiNi_{0.8}Co_{0.1}Mn_{0.1}O_2$/graphite | $LiPF_6$ | 1M | Compound 1 | 5% | Compound 11 | 2% | Compound 12 | 1.0% | / |
| Example 5 | $LiNi_{0.8}Co_{0.1}Mn_{0.1}O_2$/graphite | $LiPF_6$ | 1M | Compound 1 | 5% | Compound 11 | 3% | Compound 12 | 1.0% | / |
| Example 6 | $LiNi_{0.8}Co_{0.1}Mn_{0.1}O_2$/graphite | $LiPF_6$ | 1M | Compound 1 | 5% | Compound 10 | 1% | Compound 12 | 1.0% | / |
| Example 7 | $LiNi_{0.8}Co_{0.1}Mn_{0.1}O_2$/graphite | $LiPF_6$ | 1M | Compound 1 | 0.1% | Compound 11 | 1% | Compound 12 | 1.0% | / |
| Example 8 | $LiNi_{0.8}Co_{0.1}Mn_{0.1}O_2$/graphite | $LiPF_6$ | 1M | Compound 1 | 1% | Compound 11 | 1% | Compound 12 | 1.0% | / |
| Example 9 | $LiNi_{0.8}Co_{0.1}Mn_{0.1}O_2$/graphite | $LiPF_6$ | 1M | Compound 1 | 3% | Compound 11 | 1% | Compound 12 | 1.0% | / |
| Example 10 | $LiNi_{0.8}Co_{0.1}Mn_{0.1}O_2$/graphite | $LiPF_6$ | 1M | Compound 1 | 10% | Compound 11 | 1% | Compound 12 | 1.0% | / |
| Example 11 | $LiNi_{0.8}Co_{0.15}Al_{0.05}O_2$/graphite | $LiPF_6$ | 1M | Compound 3 | 5% | Compound 11 | 1% | Compound 13 | 0.5% | / |
| Example 12 | $LiNi_{0.6}Co_{0.2}Mn_{0.2}O_2$/graphite | $LiPF_6$ | 1M | Compound 4 | 5% | Compound 11 | 1% | Compound 14 | 1.5% | / |
| Example 13 | $LiNi_{0.5}Co_{0.2}Mn_{0.3}O_2$/graphite | $LiPF_6$ | 1M | Compound 5 | 5% | Compound 11 | 1% | Compound 12 | 0.1% | / |
| Example 14 | $LiNi_{0.8}Co_{0.1}Mn_{0.1}O_2$/graphite | $LiPF_6$ | 0.5M | Compound 6 | 5% | Compound 11 | 1% | Compound 12 | 0.3% | / |
| Example 15 | $LiNi_{0.8}Co_{0.1}Mn_{0.1}O_2$/graphite | $LiPF_6$ | 0.8M | Compound 7 | 5% | Compound 11 | 1% | Compound 12 | 0.5% | / |
| Example 16 | $LiNi_{0.8}Co_{0.1}Mn_{0.1}O_2$/graphite | $LiPF_6$ | 1.2M | Compound 8 | 5% | Compound 11 | 1% | Compound 12 | 2.0% | / |
| Example 17 | $LiNi_{0.8}Co_{0.1}Mn_{0.1}O_2$/graphite | $LiPF_6$ | 1.5M | Compound 9 | 5% | Compound 11 | 1% | Compound 13 | 1.0% | / |
| Example 18 | $LiNi_{0.8}Co_{0.1}Mn_{0.1}O_2$/graphite | LiFSI | 1M | Compound 1 | 5% | Compound 11 | 1% | Compound 14 | 1.0% | / |
| Example 19 | $LiNi_{0.8}Co_{0.1}Mn_{0.1}O_2$/95% graphite + 5% SiO | $LiPF_6$ | 1M | Compound 2 | 5% | Compound 11 | 1% | Compound 12 | 0.5% | 0.5% FEC, 1% PST |
| Example 20 | $LiNi_{0.8}Co_{0.1}Mn_{0.1}O_2$/90% graphite + 10% SiO | LiDFOB | 1M | Compound 2 | 5% | Compound 11 | 1% | Compound 12 | 0.5% | 0.3% VEC, 2% 1,3-PS |
| Example 21 | $LiNi_{0.8}Co_{0.1}Mn_{0.1}O_2$/85% graphite + 15% SiO | $LiPF_6$ | 1M | Compound 2 | 5% | Compound 11 | 1% | Compound 12 | 0.5% | 0.5% VC, 1% DTD, 0.5% SN |
| Example 22 | $LiNi_{0.8}Co_{0.1}Mn_{0.1}O_2$/75% graphite + 25% SiO | LiTFSI | 1M | Compound 2 | 5% | Compound 11 | 0.5% | Compound 12 | 0.5% | 0.5% VC, 1% ADN, 2% DTD |
| Example 23 | $LiNi_{0.8}Co_{0.1}Mn_{0.1}O_2$/75% graphite + 25% silicon-carbon composite | LiTFS | 1M | Compound 2 | 5% | Compound 11 | 0.5% | Compound 12 | 0.5% | 0.5% VC, 0.3% SN |

TABLE 1-continued

The battery system, related substances and content of Examples 1 to 23 and comparative Examples 1 to 8

| | Battery system | Lithium salt Species | Concen-tration | Additive A Species | Content | Additive B Species | Content | Additive C Species | Content | Other additive and content |
|---|---|---|---|---|---|---|---|---|---|---|
| Comparative example 1 | $LiNi_{0.8}Co_{0.1}Mn_{0.1}O_2$/graphite | $LiPF_6$ | 1M | / | / | / | / | / | / | / |
| Comparative example 2 | $LiNi_{0.8}Co_{0.1}Mn_{0.1}O_2$/graphite | $LiPF_6$ | 1M | Compound 1 | 5% | / | / | / | / | / |
| Comparative example 3 | $LiNi_{0.8}Co_{0.1}Mn_{0.1}O_2$/graphite | $LiPF_6$ | 1M | / | / | Compound 11 | 1% | / | / | / |
| Comparative example 4 | $LiNi_{0.8}Co_{0.1}Mn_{0.1}O_2$/graphite | $LiPF_6$ | 1M | / | / | / | / | Compound 12 | 1.0% | / |
| Comparative example 5 | $LiNi_{0.8}Co_{0.1}Mn_{0.1}O_2$/graphite | $LiPF_6$ | 1M | Compound 1 | 5% | Compound 11 | 1% | / | / | / |
| Comparative example 6 | $LiNi_{0.8}Co_{0.1}Mn_{0.1}O_2$/graphite | $LiPF_6$ | 1M | Compound 1 | 5% | / | / | Compound 12 | 1.0% | / |
| Comparative example 7 | $LiNi_{0.8}Co_{0.1}Mn_{0.1}O_2$/graphite | $LiPF_6$ | 1M | Compound 1 | 15% | Compound 11 | 1% | Compound 12 | 1.0% | / |
| Comparative example 8 | $LiNi_{0.8}Co_{0.1}Mn_{0.1}O_2$/graphite | $LiPF_6$ | 1M | Compound 3 | 5% | Compound 11 | 4% | Compound 12 | 1.0% | / |

TABLE 2

Performance Test Results of Examples 1 to 23 and Comparative Examples 1 to 8

| | The capacity retention rate after 500 cycles at 45° C. | Volume expansion rate after being stored at 80° C. for 10 days | −25° C. DCR/mohm | Hot box test at 150° C. |
|---|---|---|---|---|
| Example 1 | 83.1% | 16.7% | 240.5 | 5 batteries are in good condition |
| Example 2 | 89.5% | 15.4% | 248.9 | 5 batteries are in good condition |
| Example 3 | 92.1% | 14.7% | 256.1 | 5 batteries are in good condition |
| Example 4 | 86.5% | 13.2% | 254.3 | 5 batteries are in good condition |
| Example 5 | 78.9% | 10.9% | 260.4 | 5 batteries are in good condition |
| Example 6 | 91.2% | 15.9% | 265.3 | 5 batteries are in good condition |
| Example 7 | 76.7% | 13.2% | 265.4 | 5 batteries are in good condition |
| Example 8 | 84.6% | 12.5% | 245.6 | 5 batteries are in good condition |
| Example 9 | 90.7% | 11.4% | 240.5 | 5 batteries are in good condition |
| Example 10 | 79.4% | 9.8% | 270.8 | 5 batteries are in good condition |
| Example 11 | 91.4% | 10.7% | 258.4 | 5 batteries are in good condition |
| Example 12 | 92.5% | 11.5% | 260.3 | 5 batteries are in good condition |
| Example 13 | 90.7% | 12.4% | 300.7 | 5 batteries are in good condition |
| Example 14 | 89.6% | 10.0% | 281.6 | 5 batteries are in good condition |
| Example 15 | 91.2% | 9.8% | 260.3 | 5 batteries are in good condition |
| Example 16 | 84..3% | 9.5% | 240.5 | 5 batteries are in good condition |
| Example 17 | 89.1% | 13.4% | 253.4 | 5 batteries are in good condition |
| Example 18 | 91.0% | 12.1% | 264.8 | 5 batteries are in good condition |
| Example 19 | 92.1% | 14.3% | 286.7 | 5 batteries are in good condition |
| Example 20 | 93.5% | 8.7% | 290.4 | 5 batteries are in good condition |
| Example 21 | 90.7% | 9.0% | 285.3 | 5 batteries are in good condition |

TABLE 2-continued

Performance Test Results of Examples 1 to 23 and Comparative Examples 1 to 8

| | The capacity retention rate after 500 cycles at 45° C. | Volume expansion rate after being stored at 80° C. for 10 days | −25° C. DCR/mohm | Hot box test at 150° C. |
|---|---|---|---|---|
| Example 22 | 92.8% | 10.5% | 290.2 | 5 batteries are in good condition |
| Example 23 | 93.4% | 12.4% | 278.9 | 5 batteries are in good condition |
| Comparative example 1 | 69.1% | 42.1% | 290.3 | 5 batteries are on fire |
| Comparative example 2 | 72.2% | 28.9% | 280.6 | 2 batteries are on fire 3 batteries are in good condition |
| Comparative example 3 | 62.4% | 13.6% | 347.8 | 4 batteries are on fire 1 battery is in good condition |
| Comparative example 4 | 74.3% | 35.8% | 234.6 | 5 batteries are on fire |
| Comparative example 5 | 87.5% | 12.4% | 340.7 | 5 batteries are in good condition |
| Comparative example 6 | 73.9% | 30.4% | 237.1 | 5 batteries are on fire |
| Comparative example 7 | 58.4% | 9.3% | 356.4 | 5 batteries are in good condition |
| Comparative example 8 | 60.5% | 10.7% | 324.5 | 2 batteries are on fire 3 batteries are in good condition |

Result Analysis (1) Comparison Between Comparative Example 1 and Comparative Example 2

It can be seen from Comparative Example 1 and Comparative Example 2, when only additive A (Compound 1) is added to the non-aqueous electrolyte of the lithium ion batteries of Comparative Example 2, the storage volume expansion rate of the lithium ion batteries at 80° C. is remarkably reduced, from 42.1% to 28.9%, reduced by 13.2%. The storage life after 500 cycles at 45° C. and the low temperature DC resistance at −25° C. are also slightly improved.

(2) Comparison Between Comparative Example 1 and Comparative Example 3

It can be seen from Comparative Example 1 and Comparative Example 3, when only additive B (Compound 11) is added to the non-aqueous electrolyte of the lithium ion batteries of Comparative Example 3, the storage volume expansion rate of the lithium ion batteries at 80° C. is remarkably reduced, from 42.1% to 13.6%, reduced by 28.8%; However, the storage performance of the batteries after 500 cycles at 45° C. is obviously deteriorated. After being stored under 150° C., there are four lithium ion batteries on fire, and the low temperature DC resistance is also obviously increased.

(3) Comparison Between Comparative Example 1 and Comparative Example 4

It can be seen from Comparative Example 1 and Comparative Example 4, when only additive C (Compound 12) is added to the non-aqueous electrolyte of the lithium ion batteries of Comparative Example 4, the storage volume expansion rate of lithium ion batteries at 80° C., the cycle storage performance at 45° C. and the low temperature DC resistance at −25° C. are slightly improved. However, the high temperature storage performance at 150° C. is poor, the five batteries tested are on fire.

(4) Comparison Between Comparative Example 5 and Comparative Examples 2 to 3

It can be seen from Comparative Example 5 and Comparative Examples 2 to 3, when additive A (Compound 1) and additive B (Compound 11) are added to Comparative Example 5, under the synergistic effect of compound 1 and compound 11, the cycle performance of lithium ion batteries at 45° C. is improved remarkably, the capacity retention rate after 500 cycles is 87.5%, but the low temperature DC resistance value is still large, i.e. is about 340.7 mohm.

(5) Comparison Between Examples 1 to 18 and Comparative Examples 1 to 8

It can be seen from Examples 1 to 18 and Comparative Examples 1 to 8, when additive A, additive B and additive C are added to the non-aqueous electrolyte of the lithium ion batteries at the same time, due to the synergistic effect of additives A, B and C, the lithium ion batteries have a high cyclic capacity retention rate and a storage capacity retention rate and a low gas production rate at high temperature, have a low direct current resistance at low temperature. The thermal stability of the batteries can be significantly improved, the five batteries after being stored under 150° C. are in good condition.

(6) Comparison Between Examples 19 to 23 and Comparative Examples 1 to 8

It can be seen from Examples 19 to 23 and Comparative Examples 1 to 8, when additive A, additive B, additive C and other additives are added to the non-aqueous electrolyte of the lithium ion batteries, due to the synergistic effect of additives A, B and C together with other additives, the performance of lithium ion batteries have been significantly improved. The lithium ion batteries have a high cyclic capacity retention rate and a storage capacity retention rate and a low gas production rate at high temperature, and have a low direct current resistance at low temperature. The thermal stability of the batteries can be significantly improved. Five batteries after being stored under 150° C. are in good condition.

(7) Comparison Between Examples 1 to 23 and Comparative Example 5

Since additives A, B and C are added at the same time in Examples 1 to 23, the performances of the lithium ion batteries are good under the synergistic effect of additives A, B and C. However, in Comparative Example 5, only additive A and additive B are added. Although the capacity retention rate after 500 cycles of the batteries and the storage volume expansion rate at 80° C. are similar to those of Examples 1 to 23, the DCR value at −25° C. is up to 340.7 mohm and the DCR values in Examples 1 to 23 is only 240.5 mohm to 300.7 mohm. The DCR value directly reflects the power performance of the battery. The lower the value is, the better the power performance of the battery is, especially the low-temperature performance of lithium ion battery. The comparison example shows that for the addition of additive C in Examples 1 to 23, the DCR value of the lithium ion batteries can be significantly reduced, which explains that additive C could cooperate with additives A and B in the electrolyte to improve the performance of lithium ion batteries.

(8) Comparison Between Examples 1 to 23 and Comparative Example 6

Because additives A, B and C are added in Examples 1 to 23 at the same time, the performances of the lithium ion batteries are good under the synergistic effect of additives A, B and C. However, in Comparative Example 6, only additive A and additive C are added. Although the DCR value of the battery at −25° C. is equivalent to that of the embodiment or even much smaller than the DCR value of some embodiments, the capacity retention rate after 500 cycles and the storage volume expansion rate at 80° C. are much worse than those of Examples 1 to 23. As a result, the five tested batteries are all on fire after being stored at 150° C.

It can be seen from the comparison that only when additive A, additive B and additive C are added to the electrolyte at the same time, additives A, B, C can work together so as to keep the good performance of the battery. In absence of any one of the additives, the test results will be affected, and could not meet the actual demand.

(9) Comparison Between Examples 3, 10 and Comparative Example 7

It can be seen from Examples 3 and 10 and Comparative Example 7, when the weight content of additive A in the electrolyte of Comparative Example 7 is 15%, due to the content of additive A is too high, the viscosity of the electrolyte will be significantly increased, and the conductivity of the electrolyte will be reduced, which will reduce the migration rate of lithium ion and deteriorate the cycle performance of lithium ion battery.

Compared with the conventional technologies, the lithium ion battery and the electrolyte thereof according to the present invention at least have the following technical advantages.

(1) The lithium ion battery electrolyte of the present invention has a cyclic phosphazene compound, a lithium fluorophosphate compound and at least one compound selected from a group consisting of a silane phosphate compound, a silane phosphite compound and a silane borate compound as additive, which can significantly improve the high temperature storage performance and stability of the battery and can inhibit the gas production phenomenon of the lithium ion battery at high temperature;

(2) The lithium ion battery of the invention has excellent high temperature cycle storage performance; and (3) The lithium ion battery of the present invention has low low-temperature resistance.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Moreover, although the foregoing descriptions describe example embodiments, it should be appreciated that alternative embodiments without departing from the scope of the appended claims. Although specific terms are employed herein, they are used in a generic and descriptive sense only and not for purposes of limitation.

What is claimed is:

1. A lithium ion battery, comprising: a positive electrode plate, a negative electrode plate, a separator interposed between the positive electrode plate and the negative electrode plate, and an electrolyte, the positive electrode plate comprising a positive electrode current collector and a positive electrode active material formed thereon, the negative electrode plate comprising a negative electrode current collector and a negative electrode active material formed thereon, wherein the electrolyte comprises a non-aqueous organic solvent, a lithium salt, and additives, the additives comprise additive A cyclophosphazene compound, additive B lithium fluorophosphate compound, and additive C selected from at least one of silane phosphate compound, silane phosphite compound and silane borate compound, wherein the positive electrode active material is $LiNi_{1-x-y}Co_xM_yO_2$, M is Mn or Al, $0 \leq x \leq 0.5$, $0 \leq y \leq 0.5$, $0 \leq x+y \leq 0.5$, and a weight content of the additive A in the electrolyte is no less than a weight content of the additive B in the electrolyte, and no less than a weight content of the additive C in the electrolyte, and wherein the additive A is selected from at least one of the compounds represented by formula I;

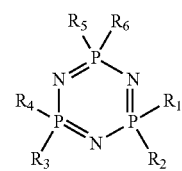

wherein $R_1$, $R_2$, $R_3$, $R_4$, $R_5$, $R_6$ are each independently selected from F, Cl, Br, I, an alkyl group having 1 to 20 carbon atoms, a halogenated alkyl group having 1 to 20 carbon atoms, an alkenyl group having 2 to 20 carbon atoms, a halogenated alkenyl group having 2 to 20 carbon atoms, an aryl group having 6 to 26 carbon atoms, a halogenated aryl group having 6 to 26 carbon atoms, a halogenated alkoxy group having 1 to 20 carbon atoms, an aryloxy group having 6 to 26 carbon atoms, a halogenated aryloxy group having 6 to 26 carbon atoms, at least one of $R_1$, $R_3$ and $R_5$ represents an alkyl group having 1 to 20 carbon atoms, a halogenated alkyl group having 1 to 20 carbon atoms, an alkenyl group having 2 to 20 carbon atoms, a halogenated alkenyl group having 2 to 20 carbon atoms, an aryl group having 6 to 26 carbon atoms, a halogenated aryl group having 6 to 26 carbon atoms, a halogenated alkoxy group having 1 to 20 carbon atoms, an aryloxy group having 6 to 26 carbon atoms, a halogenated aryloxy group having 6 to 26 carbon atoms, at least two of $R_2$, $R_4$, $R_6$ are selected from F, Cl, Br, I.

2. The lithium ion battery according to claim 1, wherein the weight content of the additive A in the electrolyte is 0.1 wt % to 10 wt %.

3. The lithium ion battery according to claim 1, wherein the weight content of the additive B in the electrolyte is 0.1 wt % to 3 wt %.

4. The lithium ion battery according to claim 1, wherein the additive C is selected from at least one of the compounds represented by formulas II, III and IV;

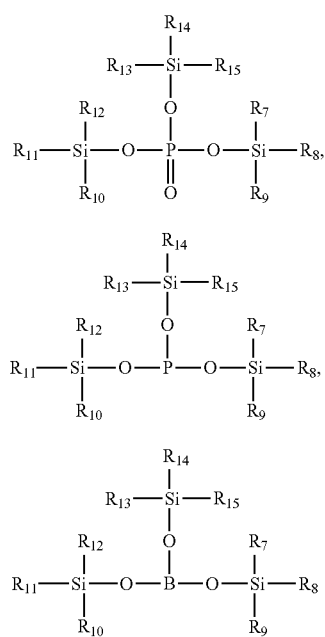

wherein $R_7$, $R_8$, $R_9$, $R_{10}$, $R_{11}$, $R_{12}$, $R_{13}$, $R_{14}$, $R_{15}$ are each independently selected from an alkyl group or a halogenated alkyl having 1 to 6 carbon atoms.

5. The lithium ion battery according to claim 4, wherein the weight content of the additive C in the electrolyte is 0.1 wt % to 2 wt %.

6. The lithium ion battery according to claim 1, wherein the organic solvent is selected from at least two of the group consisting of ethylene carbonate, propylene carbonate, butylene carbonate, fluoroethylene carbonate, methyl ethyl carbonate, dimethyl carbonate, diethyl carbonate, dipropyl carbonate, methyl propyl carbonate, ethyl propyl carbonate, 1,4-butyrolactone, γ-butyrolactone, methyl propionate, methyl butyrate, ethyl acetate, ethyl propionate, and ethyl butyrate.

7. The lithium ion battery according to claim 1, wherein the lithium salt is selected from at least one of $LiPF_6$, $LiClO_4$, $LiAsF_6$, LiTFSI, LiFSI, LiDFOB, LiDFOP, LiBOB, and a mole concentration of the lithium salt is 0.5M to 1.5M.

8. The lithium ion battery according to claim 1, wherein the electrolyte further comprises at least one of vinylene carbonate (VC), vinyl ethylene carbonate (VEC), fluoroethylene carbonate (FEC), succinonitrile (SN), adiponitrile (ADN), ethylene sulfate (DTD), 1,3-propane sultone (1,3-PS), 1,3-propene sultone (PST).

9. The lithium ion battery according to claim 1, wherein the lithium salt is selected from at least one of $LiPF_6$, $LiClO_4$, $LiAsF_6$, LiTFSI, LiFSI, LiDFOB, LiDFOP, LiBOB, and a mole concentration of the lithium salt is 0.8M to 1.2M.

* * * * *